US010044037B2

(12) United States Patent
Chi et al.

(10) Patent No.: US 10,044,037 B2
(45) Date of Patent: *Aug. 7, 2018

(54) MANUFACTURING A LEAD-ACID BATTERY THAT INCLUDES A COMPOSITE THAT INCLUDES LEAD OXIDE AND A NANOMATERIAL

(71) Applicants: Dun Chi, Beijing (CN); Yimin Chen, Changsha (CN)

(72) Inventors: Dun Chi, Beijing (CN); Yimin Chen, Changsha (CN)

(*) Notice: Subject to any disclaimer, the term of this patent is extended or adjusted under 35 U.S.C. 154(b) by 666 days.

This patent is subject to a terminal disclaimer.

(21) Appl. No.: 14/635,928

(22) Filed: Mar. 2, 2015

(65) Prior Publication Data

US 2016/0260971 A1  Sep. 8, 2016

(51) Int. Cl.
| | |
|---|---|
| *H01M 4/57* | (2006.01) |
| *H01M 4/04* | (2006.01) |
| *H01M 4/14* | (2006.01) |
| *H01M 10/12* | (2006.01) |
| *H01M 10/06* | (2006.01) |
| *H01M 4/56* | (2006.01) |

(52) U.S. Cl.
CPC .............. *H01M 4/57* (2013.01); *H01M 4/14* (2013.01); *H01M 4/56* (2013.01); *H01M 10/06* (2013.01)

(58) Field of Classification Search
CPC .......... H01M 10/06; H01M 4/14; H01M 4/16; H01M 4/18; H01M 4/20; H01M 4/21; H01M 4/56; H01M 4/57; H01M 4/627; H01M 10/121
See application file for complete search history.

(56) References Cited

U.S. PATENT DOCUMENTS

| | | | |
|---|---|---|---|
| 6,572,997 B1 | 6/2003 | Iqbal et al. | |
| 7,955,581 B2 | 6/2011 | Kogetsu et al. | |
| 2004/0175623 A1 | 9/2004 | Feng et al. | |
| 2012/0115031 A1* | 5/2012 | Atanassova ............ | H01M 4/14 429/228 |
| 2012/0248383 A1 | 10/2012 | Atanassova et al. | |
| 2013/0078515 A1 | 3/2013 | Reynolds et al. | |
| 2013/0224579 A1 | 8/2013 | Berrang | |

FOREIGN PATENT DOCUMENTS

| | | |
|---|---|---|
| CN | 102195097 | 9/2011 |
| WO | 2012163426 | 12/2012 |

* cited by examiner

*Primary Examiner* — Carlos Barcena
(74) *Attorney, Agent, or Firm* — Meyertons, Hood, Kivlin, Kowert & Goetzel, P.C.

(57) ABSTRACT

The disclosure relates to the manufacturing of a lead-acid battery that includes a composite that includes lead oxide and a nanomaterial. A method of preparing the composite is disclosed. In one embodiment, an in-situ sol-gel reaction of a solution occurs in the presence of lead oxide to produce a composite that includes the lead oxide and a nanomaterial (e.g., a nano-oxide). The solution may include a precursor that includes metal alkoxide or silicate. The composite may include the lead oxide and the nanomaterial dispersed or distributed among particles of the lead oxide. A lead-acid battery may be manufactured using the composite. Various properties of a lead-acid battery may be improved by using the composite as part of the active material including a longer life expectancy, increased specific energy and increased power-to-weight ratio.

20 Claims, 5 Drawing Sheets

MANUFACTURING A LEAD-ACID BATTERY THAT INCLUDES A COMPOSITE THAT INCLUDES LEAD OXIDE AND A NANOMATERIAL

BACKGROUND

An electric battery is an energy storage device that converts chemical energy into electrical energy. A typical battery design includes a positive electrode and a negative electrode. A typical battery design also includes an electrolyte that facilitates ion exchanges between the positive and negative electrodes. Current flows out of the battery to perform work as a result.

Batteries may be divided into disposable batteries and rechargeable batteries. An example of a rechargeable battery may include lead-acid batteries. Lead-acid batteries may be used in a variety of applications. For example, lead-acid batteries may be used as starting and powering batteries or as a source of back-up power to ensure continuous energy supply to uninterruptible services such medical services or data maintenance services. Lead-acid batteries come in a variety of types, sizes and capacities. Valve regulated lead-acid batteries or sealed lead-acid batteries are among the many varieties of lead-acid battery.

Generally speaking, lead-acid batteries are considered to be a cost-effective, versatile, and reliable. Other advantages of lead-acid batteries may include high charge retention, low-self discharge and low maintenance requirements. There is a continuous need to improve the power density, efficiency and life expectancy of lead-acid batteries.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware—for example, circuits, memory storing program instructions executable to implement the operation, etc.—mechanical devices, or other types of structure. Reciting that a device/unit/circuit/component is "configured to," "usable to," or "operable to" perform one or more tasks is expressly intended not to invoke 35 U.S.C. § 112(f), for that device/unit/circuit/component.

A lead-acid battery is an electrochemical energy storage device that uses a reversible chemical reaction to store energy. A typical lead-acid battery may contain a combination of positive and negative plates and an electrolyte such as sulfuric acid to convert electrical energy into chemical energy or from chemical energy into electrical energy.

The negative plate may include a metal such as lead. The positive plate may include lead oxide. During discharge cycles, the lead metal (Pb) on the negative plate reacts with the electrolyte (e.g., sulfuric acid or $H_2SO_4$) to produce lead sulfate ($PbSO_4$), whereas the lead oxide ($PbO_2$) on the positive plate also reacts with the sulfuric acid ($H_2SO_4$) to produce lead sulfate ($PbSO_4$). As a result of the reactions, sulfuric acid becomes mostly water.

During charging cycles, the lead-acid battery may receive electrons from an external electrical circuit, and $PbSO_4$ on the negative and positive plates are converted to Pb and $PbO_2$, respectively.

In a typical lead-acid battery design, the positive and negative plates may each be supported by a grid. The grid may include a number of perforations that may be filled with a paste (sometimes called a battery paste). The composition of the paste may depend on the raw materials and the chemical or physical reactions that the raw materials undergo. In a lead-acid battery, the paste used for a negative plate may be the same or different from the paste used for a positive plate.

Figure 1:
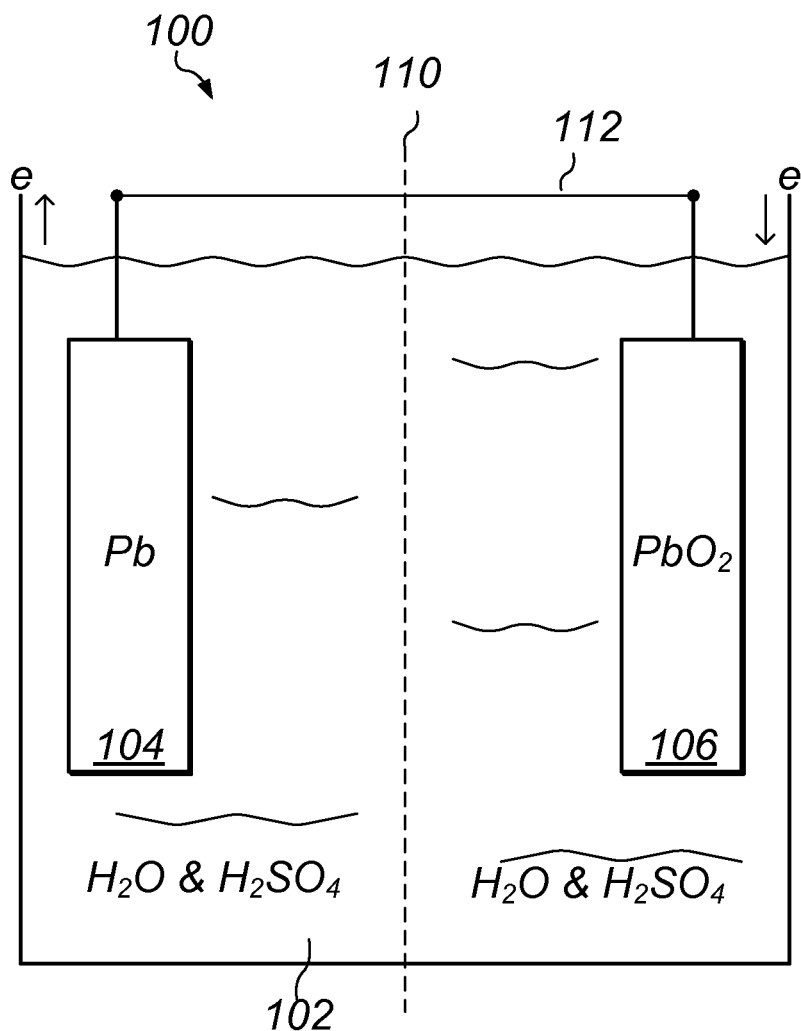
FIG. 1 illustrates a representation of a lead-acid battery.

FIG. 1 illustrates a representation of lead-acid battery 100. Lead-acid battery 100 may include negative plate 104. Negative plate 104 may include a paste that includes Pb. The paste may be applied over a grid (not in view) to form negative plate 104. During a discharging cycle, negative plate 104 may donate electrons (illustrated as "e") via electrical connection 112.

Lead-acid battery 100 may also include positive plate 106. A surface of positive plate 106 may include a paste having an active material such as lead oxide. The paste may be applied over a grid (not in view) to form positive plate 106. Positive plate 106 may receive electrons during a charging cycle via electrical connection 112.

Lead-acid battery 100 may include electrolyte 102. In this particular illustration, electrolyte 102 includes $H_2SO_4$ and water ($H_2O$). In other embodiments, however, electrolyte 102 may include other types of electrolyte not limited to $H_2SO_4$. In addition to being in aqueous form in this illustration, electrolyte 102 may include other mobile or immobile forms of electrolyte.

Both negative plate 104 and positive plate 106 may be immersed in electrolyte 102. Electrolyte 102 may serve as a conduit for electrons to flow between positive and negative plates 104 and 106. The chemical reactions involved in lead-acid battery 100 may include:

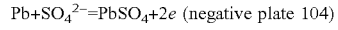

$Pb + SO_4^{2-} = PbSO_4 + 2e$ (negative plate 104)

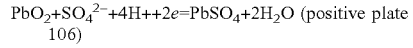

$PbO_2 + SO_4^{2-} + 4H^+ + 2e = PbSO_4 + 2H_2O$ (positive plate 106)

$Pb + PbO_2 + 2H_2SO_4 = 2PbSO_4 + 2H_2O$ (total reaction)

The chemical reactions shown may result in a surplus of electrons at negative plate 104 while a deficit of electrons may exist at positive plate 106. More specifically, when discharging, the electrons at negative plate 104 and the electrons from electrolyte solution 102 move to positive plate 106. When charging, the reverse occurs.

Lead-acid battery 100 may include separator 110. Separator 110 may be configured to electrically isolate negative plate 104 from positive plate 106. In some embodiments, however, separator 110 is optional and not required.

Figure 2:
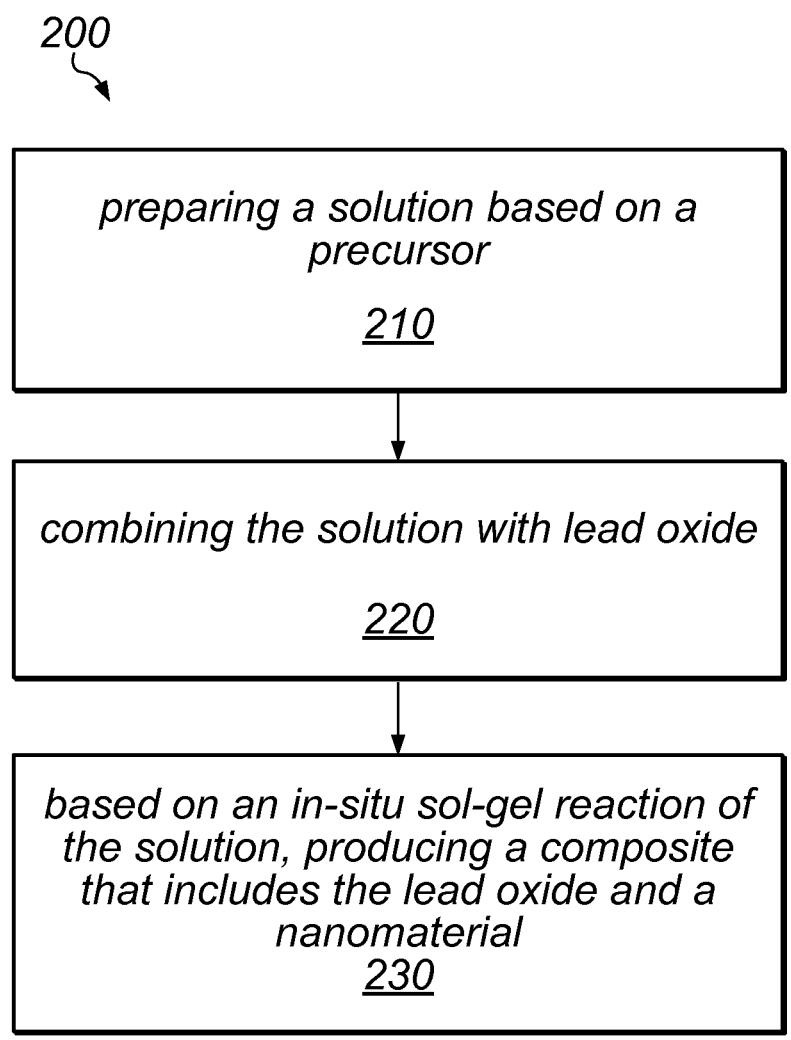
FIG. 2 illustrates a method of making a component of a lead-acid battery according to an embodiment of the disclosure herein.

Turning now to FIG. 2 in which method 200 for making a component of a lead-acid battery is illustrated. Specifically, method 200 is directed to making a portion of a lead-acid battery such as lead-acid battery 100. Method 200 starts at block 210.

A block 210, preparing a solution based on a precursor. The solution may be a colloidal solution. The precursor may include various compositions. As one example, the precursor may include a solvent, water, a polymer and a metal alkoxide. An alternative precursor may include water, a polymer and a silicate. In one embodiment, a composition of the precursor may include: 1 part of metal alkoxide, 20 to 200 parts of solvent, 0.01 to 0.1 parts of water and 0.0001 to 0.02 parts of polymer. In another embodiment, however, the composition of the precursor may include: 1 part of silicate, 5 to 20 parts of water and 0.0001 to 0.02 parts of polymer.

The metal alkoxide may include at least one of: tetramethyl orthosilicate (e.g., $Si(OCH_3)_4$), tetraethyl orthosilicate (e.g., $Si(OC_2H_5)_4$), tetrabutyl titanate (e.g., $Ti(OC_4H_9)_4$), titanium ethoxide (e.g., $Ti_4(OC_2H_5)_{16}$), titanium isopropoxide (e.g., $Ti(OC_3H_7)_4$), titanium tert-butoxide (e.g., $Ti(OC_4H_9)_4$) or any combination thereof. Other metal oxides are specifically contemplated and included here.

The silicate may include at least one of: sodium silicate (e.g., $Na_2SiO_3$, $Na_4SiO_4$, or a combination of $Na_2SiO_3$ and $Na_4SiO_4$), potassium silicate (e.g., $K_2SiO_3$, $K4SiO_4$, or a combination of $K_2SiO_3$ and $K_4SiO_4$), or lithium silicate (e.g., $Li_2SiO_3$, $Li_4SiO_4$, or a combination of $Li_2SiO_3$ and $Li4SiO_4$). In certain embodiments, the silicate may be in aqueous form, that is, the aqueous form of the silicate may include at least one of: sodium silicate in aqueous form (may also be referred to as "sodium water glass"), potassium silicate in aqueous form (may also be referred to as "potassium water glass"), or lithium silicate in aqueous form (may also be referred to as "lithium water glass"). Other forms of silicate may be specifically contemplated and included here.

The solvent may include methanol (e.g., $CH_4O$), ethanol (e.g., $C_2H_6O$), isopropyl alcohol (e.g., $C_3H_8O$), n-butanol (e.g., $C_4H_9OH$), isobutanol (e.g., $(CH_3)_2CHCH_2OH$), tert-butyl alcohol (e.g., $C_4H_{10}O$), acetone (e.g., $C_3H_6O$), acetylacetone (e.g., $C_5H_8O_2$), butanone (e.g., $C_4H_8O$), ethanolamine (e.g., $C_2H_7NO$), or any combination thereof. Other solvents are specifically contemplated and included here.

The polymer may include a naturally occurring polymer or a synthetic polymer. The polymer may include but is not limited to a water-soluble polymer. For example, the polymer includes at least one of: polyethylene glycol, polyvinyl alcohol, polyacrylamide, phenol formaldehyde resin, a gelatin type material, polyethyleneimine, polyacrylic acid, polymethacrylic acid, or cellulose. In some embodiments, the polymer may facilitate stabilizing the solution.

In a non-limiting embodiment, a catalyst may be applied to the solution. In one non-limiting embodiment, the catalyst may include an acidic catalyst. The acidic catalyst may include at least one of: nitric acid, sulfuric acid, hydrochloric acid, phosphoric acid, propionic acid, acetic acid, formic acid, tartaric acid, citric acid, salicylic acid, oxalic acid, or any combination thereof. In an alternative embodiment, however, an alkaline catalyst may be applied to the in-situ sol-gel reaction. The alkaline catalyst may include at least one of: ammonia, ethanol amine, diethanolamine, triethanolamine, sodium hydroxide, potassium hydroxide, lithium hydroxide, magnesium hydroxide, or any combination thereof. Other catalysts are specifically contemplated and included here.

The operation proceeds to block 220. At block 220, the solution is combined with lead oxide. In one non-limiting embodiment, the lead oxide being combined with the solution may be in powder form. For example, lead oxide having a grain size that is between 1 micrometer and 50 micrometers may be considered to be in powder form. However, the lead oxide is not limited to a particular grain size or a particular grain size range. The lead oxide may include at least one of: lead monoxide (e.g., $PbO$), lead dioxide (e.g., $PbO_2$), triplumbic tetroxide (e.g., $Pb_3O_4$), or any combination thereof. Operation proceeds to block 230.

At block 230, a composite is produced based on an in-situ sol-gel reaction of the solution in the presence of the lead oxide. That is, the in-situ sol-gel reaction occurs in-situ based on the lead oxide. The composite may include the lead oxide and a nanomaterial that has been in-situ formed based on the sol-gel reaction. In some embodiments, the in-situ sol-gel reaction may result in a gel such as a hydrophilic gel. The gel may undergo further processing (e.g., water and/or solvent removal) to produce the composite.

For example, a solution may be prepared based on a precursor that includes a metal oxide such as tetraethyl orthosilicate (e.g., $Si(OC_2H_5)_4$) (which may also be referred to as TEOS, ethyl orthosilicate, or other names or trade names used in the industry). When an acidic or alkaline catalyst is applied to the tetraethyl orthosilicate, silicic acid may be produced under a hydrolytic condition. The silicic acid may be a compound that includes a silicon element and hydroxyl groups. For example, $H_4SiO_4$ is a silicic acid that includes one silicon element and a hydroxyl group. Based on an in-situ sol-gel reaction, the silicic acid may produce polymeric silica gel, a form of silicon dioxide (e.g., $SiO_2$). For example, the silicic acid may lose water to form the polymeric silica gel during a condensation reaction that may be included in the in-situ sol-gel reaction.

A nanomaterial as used herein, may include a material in which a single unit (e.g., a particle) is sized (in at least one dimension) between 1 and 100 nanometers. In one non-limiting embodiment, the nanomaterial in-situ formed in the presence of lead oxide may have a grain size that is between 1 nanometer and 100 nanometers.

The nanomaterial may include an oxide. The oxide may include a compound that includes at least one oxygen atom and at least one metal element. For example, the nanomaterial may include at least one of: silicon dioxide (e.g., $SiO_2$), titanium dioxide (e.g., $TiO_2$) or a combination thereof. Other oxides are specifically contemplated and included here. In a non-limiting embodiment, the composite may include nano-sized silicon dioxide (e.g., $SiO_2$) having a grain size between 1 nanometer and 100 nanometers. In this or an alternative embodiment, the composite may include nano-sized titanium dioxide (e.g., $TiO_2$) having a grain size between 1 nanometer and 100 nanometers.

The in-situ sol-gel reaction may occur under either acid or basic condition. In certain embodiments, the pH value of the in-situ sol-gel reaction may be within a range between 2 and 11. In an alternative embodiment, however, the pH value of the in-situ sol-gel reaction may be outside of that range. The in-situ sol-gel reaction may occur over a temperature range between 40 Celsius and 80 Celsius.

In one particular embodiment, the in-situ sol-gel reaction may form the composite by causing the nanomaterial to be distributed among lead oxide particles. The in-situ sol-gel reaction may prevent the nanomaterial from aggregating among the lead oxide particles by facilitating the nanomaterial to form a porous network among the lead oxide particles. The nanomaterial may be dispersed or distributed among the lead oxide particles. Operation ends at block 230.

The composite may subsequently undergo a process in which water and/or solvent may be removed. For example, during the process, the composite may undergo heat treatment or otherwise be dehydrated. Part or all of the solvent included in the solution may be removed as well during the process. For example, the composite may be subjected to a heat treatment at a temperature ranging generally between 80 Celsius and 260 Celsius. Heat treatment of the composite (e.g., dehydration and/or solvent removal) may remove water and/or the solvent used at block 210. The dehydration and/or solvent removal may occur over a time interval generally between 3 to 24 hours. Other methods may be employed to remove the water and/or solvent including the use of a centrifugal separator and others.

The composite produced at block 230 may be used to manufacture a lead-acid battery. In one embodiment, the composite may form a portion of a positive or a negative plate for a lead-acid battery. Specifically, the composite may be included in an active material (e.g., a material that produces and stores electrical energy within a lead-acid battery) for the lead-acid battery such as for the positive or the negative plate of the lead-acid battery.

In one embodiment, a lead-acid battery may include a first plate and a second plate. The first plate may be a positive plate and the second plate may be a negative plate, or vice versa. Each plate may include an active material and a grid configured to provide support to the active material. The active material may include the composite for reactions with the electrolyte to facilitate the charging and the discharging of the lead acid battery.

The composite produced based on the in-situ sol-gel reaction in the presence of lead oxide may include lead oxide and the nanomaterial that has been in-situ formed. In one non-limiting embodiment, the composite may include a lead oxide particle and one or more nano-oxide particles on or around a surface of the lead oxide particle. The nano-oxide particles may be dispersed or distributed among the lead oxide particles to prevent the nano-oxide particles from aggregating with one another. For example, the nano-oxide particles dispersed or distributed among the lead oxide particles may include nano-sized oxide (e.g., silicon dioxide) particles on or around surfaces of the lead oxide particles. The composite having the nanomaterial dispersed or distributed among lead oxide particles may form an active material for the lead-acid battery.

A grain size distribution (e.g., particle size distribution) of the composite may be illustrated by a curve (e.g., a histogram) in which the x-axis is the grain size of the composite and the y-axis is a measurement of a quantity of the composite particles. The grain size distribution of the lead oxide may also be illustrated by such a curve in which the x-axis is the grain size of the lead oxide whereas the y-axis is the measurement of a quantity of the lead oxide particles. In one particular embodiment, the grain size distribution curve of the composite may include the grain size distribution curve of the lead oxide. That is, the grain size distribution curve of the composite may be wider than the grain size distribution curve of the lead oxide. In some embodiments, the grain size of the composite may be in a range between 1 nanometer and 50 micrometers whereas the grain size of the lead oxide may be in a range between 1 micrometer and 50 micrometers.

A lead-acid battery or an active material for a lead-acid battery may be manufactured using the composite that includes a lead oxide particle and one or more nano-oxide particles on or around the surface of the lead oxide particle. A surface area the composite may be greater than a surface area of the lead oxide. In one non-limiting embodiment, the surface area of the composite may be at least 30% greater than the surface area of the lead oxide. In other embodiments, however, the surface area of the composite may be between a range of 10% and 300% greater than the surface area of the lead oxide.

Figure 3:
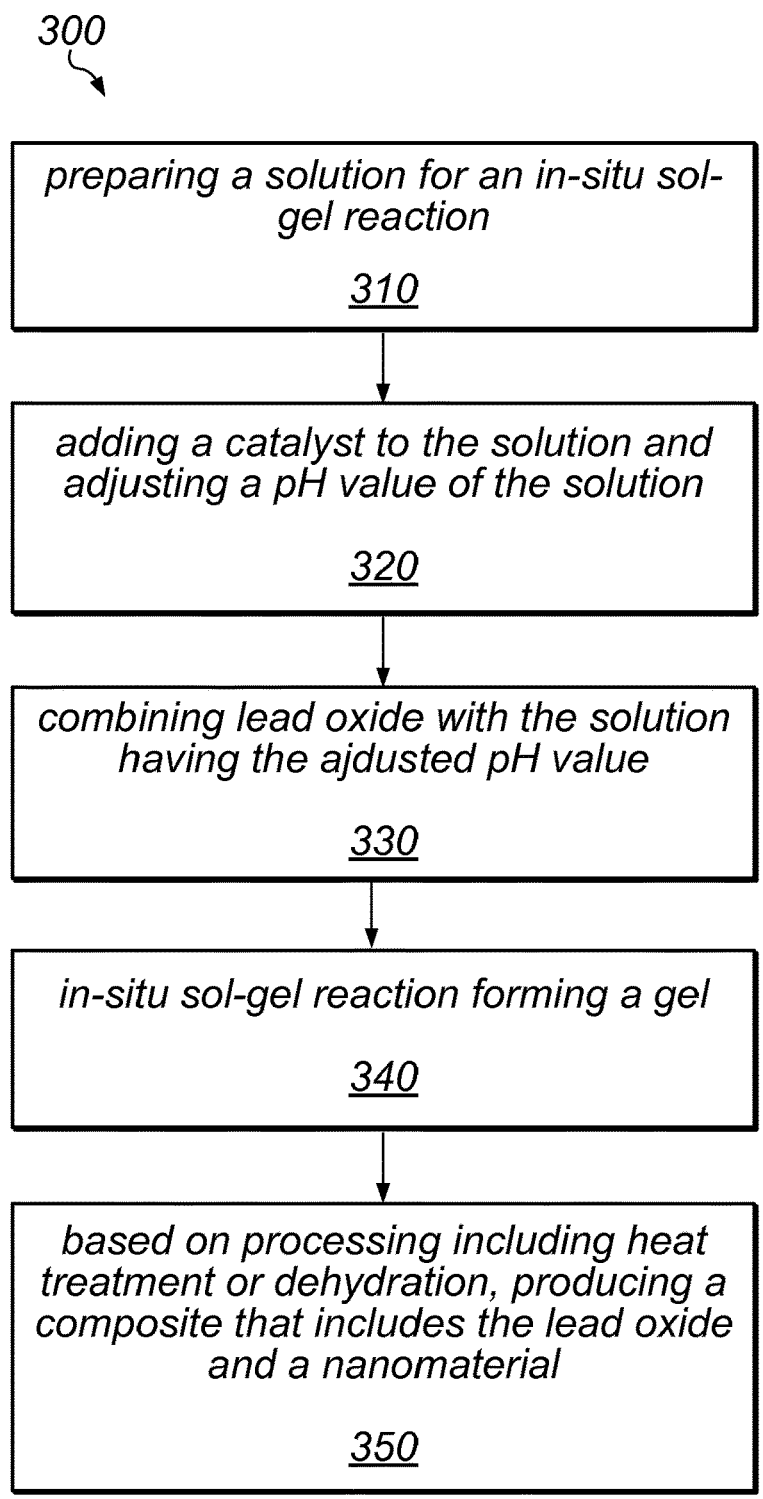
FIG. 3 illustrates an in-situ sol-gel reaction according to an embodiment of the disclosure herein.

FIG. 3 illustrates method 300 for an in-situ sol-gel reaction. Method 300 starts at block 310.

At block 310, a solution for an in-situ sol-gel reaction may be prepared. In one non-limiting example, 160 grams of isobutanol (e.g., $(CH_3)_2CHCH_2OH$)), 25 grams of water, and 5 grams of acetylacetone (e.g., $C_5H_8O_2$) may be combined. A quantity, for example, 0.15 grams of polyethylene glycol (may also be referred to as polyethylene oxide or polyoxyethylene) may also be combined with the isobutanol, water and acetylacetone. In certain embodiments, the polyethylene glycol may be dissolved in the combined isobutanol, water and acetylacetone based on heating and/or mixing. Another quantity, for example, 20 grams of tetrabutyl titanate (e.g., $Ti(OC_4H_9)_4$) may also be added to the combined isobutanol, water, acetylacetone and polyethylene glycol. In some embodiments, the tetrabutyl titanate may be added through mixing. In this particular embodiment, the solution prepared includes isobutanol, water, acetylacetone, polyethylene glycol, and tetrabutyl titanate. Operation proceeds to block 320.

At block 320, a catalyst such as nitric acid may be combined with the solution prepared at block 310. A pH value of the solution may be adjusted by adjusting the amount of the nitric acid. In a non-limiting embodiment, the pH value of the solution may be adjusted to be within the range between 2 and 7, for example, the pH value may be adjusted to 2.5. Operation proceeds to block 330.

At block 330, lead oxide may be combined with the solution having the adjusted pH value. In a non-limiting embodiment, 1000 grams of lead oxide may be combined with the solution. For example, the lead oxide may be thoroughly mixed with the solution. The mixture of lead oxide and solution may be heated to a temperature that is between a range of 40 Celsius and 80 Celsius at which point an in-situ sol-gel reaction of the solution may take place. In the non-limiting embodiment, after 1000 grams of lead oxide is combined with the solution, the mixture may be heated to and maintained at 70 Celsius. Operation proceeds to block 340.

At block 340, a gel may be formed as part of the in-situ sol-gel reaction which may be maintained at a temperature of 70 Celsius for 65 hours for an interval of time. The interval of time may be in a range between 0.1 hours to 200 hours. Operation proceeds to block 350.

At block 350, a composite that includes the lead oxide and a nanomaterial may be produced. Specifically, the in-situ sol-gel reaction may produce titanium dioxide (e.g., $TiO_2$) in this non-limiting embodiment. The titanium dioxide that has been in-situ formed and the lead oxide may be pressed or ground after being cooled to room temperature, for example, between 15 Celsius and 25 Celsius. Subsequent to the pressing or grinding, the titanium oxide that has been in-situ formed and the lead oxide may be treated to remove water and/or other substances such as the solvent. In a non-limiting embodiment, the water and/or solvent removal process may include applying a temperature for 3 hours to 24 hours to remove the water. The temperature for the water and/or solvent removal process may be maintained at a particular temperature within 100 Celsius to 260 Celsius. For example, the titanium dioxide that has been in-situ formed and the lead oxide may be heated to and maintained at a temperature of 230 Celsius for 22 hours to produce a composite that includes the lead oxide and nano-sized titanium oxide. Operation ends at block 350.

In a particular embodiment, 190 grams of ethanol (e.g., $C_2H_6O$) and 20 grams of water may be combined. In addition, 0.5 grams of a polymer such as phenol formaldehyde resin may be dissolved in the combined ethanol and water upon heating and/or mixing. After the phenol formaldehyde resin is combined, 30 grams of tetraethyl orthosilicate (e.g., $Si(OC_2H_5)_4$) may be added to form a first solution. The first solution in this example includes ethanol, water, phenol formaldehyde resin and tetraethyl orthosilicate.

Combining with the first solution with diluted sulfuric acid. Upon adjusting a pH value of the first solution to 2.5, a second solution is formed.

Combining the second solution with 1000 grams of lead oxide to facilitate an oxidation reaction. The second solution may be thoroughly mixed with the lead oxide. The combined second solution and lead oxide may be heated to and maintained at 75 Celsius for an in-situ sol-gel reaction to take place. When a gel is formed as part of the in-situ sol-gel reaction, the temperature may be maintained at 75 Celsius for 50 hours. The in-situ sol-gel reaction may produce silicon dioxide (e.g., $SiO_2$) that is in-situ formed in the presence of the lead oxide.

After cooling the gel to room temperature, the gel may be pressed or ground. Thereafter, the ground gel may be subject to a heat treatment at a temperature of 230 Celsius for 18 hours to produce a composite that includes the lead oxide and nano-sized silicon dioxide. The composite may be used to manufacture an active material for a lead-acid battery.

In an alternative embodiment, 150 grams of isopropanol (e.g., isopropyl alcohol or $C_3H_8O$) may be combined with 15 grams of water and 3 grams of acetylacetone (e.g., $C_5H_8O_2$). Upon mixing and/or heating, 0.15 grams of polyethylene glycol may be dissolved in the mixture of isopropanol, water and acetylacetone. Thereafter, 15 grams of tetraethyl orthosilicate (e.g., $Si(OC_2H_5)_4$) and 10 grams of tetrabutyl titanate (e.g., $Ti(OC_4H_9)_4$) may be added to form an initial solution. The initial solution in this example includes isopropanol, water, acetylacetone, polyethylene glycol, tetraethyl orthosilicate and tetrabutyl titanate.

Adding hydrochloric acid to the initial solution and adjusting a pH value of the initial solution to 3.6 to form a final solution.

Combining the final solution with 1000 grams of lead dioxide to facilitate an oxidation reaction. The final solution may be thoroughly mixed with the lead dioxide. The combined final solution and lead dioxide may be heated to and maintained at 65 Celsius for an in-situ sol-gel reaction to take place. When a gel is formed as part of the in-situ sol-gel reaction, the temperature may be maintained at 65 Celsius for 65 hours. The in-situ sol-gel reaction may produce silicon dioxide (e.g., $SiO_2$) and titanium dioxide (e.g., $TiO_2$) both of which are in-situ formed in the presence of the lead dioxide.

After cooling the gel to room temperature, the gel may be pressed or ground. Thereafter, the ground gel may be subject to a heat treatment at a temperature of 230 Celsius for 20 hours to produce a composite that includes the lead dioxide, nano-sized silicon dioxide and nano-sized titanium dioxide. The composite may be used to manufacture an active material for a lead-acid battery.

Figure 4:
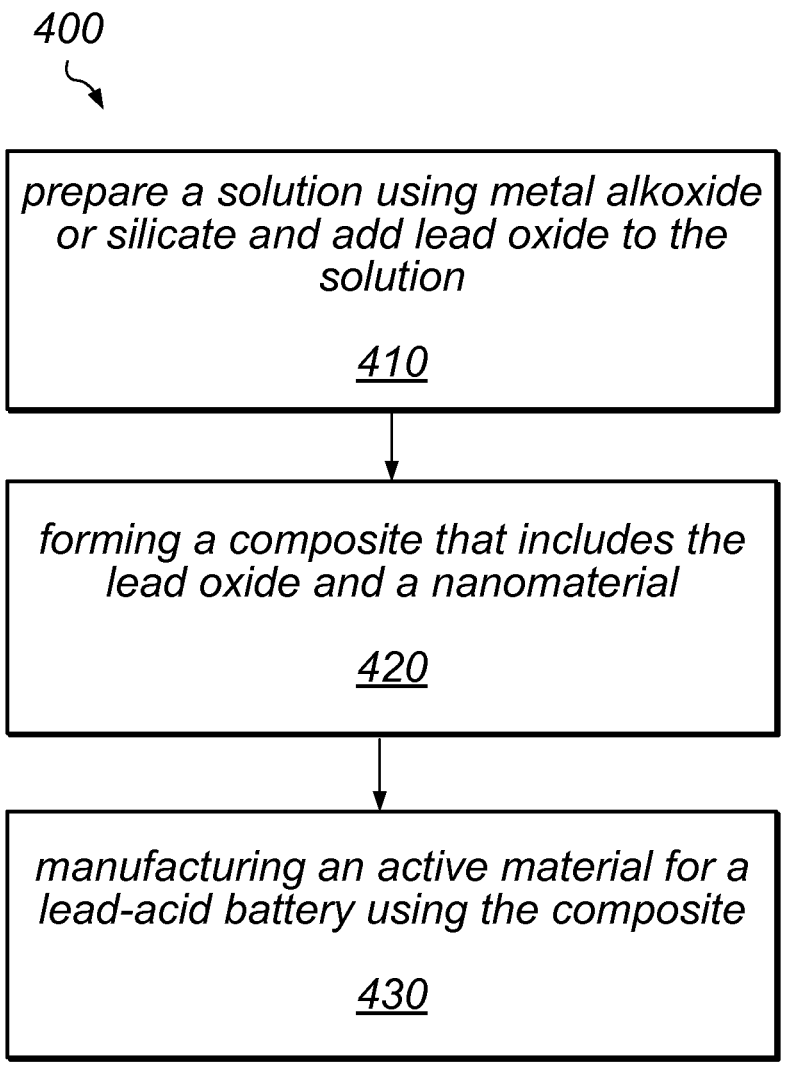
FIG. 4 illustrates a method of making a lead-acid battery according to an embodiment of the disclosure herein.

FIG. 4 illustrates method 400 for making a component of a lead-acid battery. Method 400 starts at block 410.

At block 410, a solution is prepared using metal alkoxide or silicate. In one particular embodiment, the solution may be a colloidal solution. Lead oxide is added to the solution. Operation proceeds to block 420.

At block 420, a composite that includes the lead oxide and a nanomaterial may be formed. The nanomaterial may be in-situ formed based on a sol-gel reaction of the solution. The in-situ sol-gel reaction may facilitate preventing the nanomaterial from aggregating with one another to form a material that is larger than the nanomaterial (e.g., a material that is no longer a nanomaterial). The composite may include a lead oxide portion (e.g., a lead oxide particle) and a nanomaterial portion (e.g., one or more nanomaterial particle). In one particular embodiment, the composite may include a particle having an inner portion of lead oxide and an outer portion of nanomaterial. The method proceeds to block 430.

At block 430, an active material for a lead-acid battery may be manufactured using the composite that includes the lead oxide and the nanomaterial. Operation ends at block 430.

The composite formed at block 420 may help to increase the stability and life expectancy of the active material for the lead-acid battery. For example, when used in a lead-acid battery, the composite may help reduce the expansion or reduction of the active material during charging or discharging of the lead-acid battery. The composite may also help increase the efficiency of the operation of the lead-acid battery. For example, the efficiency may increase as the grain size of the $PbSO_4$ decreases (e.g., when the active material reacts with sulfuric acid, although other electrolytes are expressly included here) when the composite reacts with sulfuric acid. In some embodiments, a positive plate or a negative plate of the lead-acid battery may include the composite. The positive or negative plate may be operable to react with an electrolyte (e.g., sulfuric acid in aqueous form) to charge or discharge the lead-acid battery. The nanomaterial included in the composite may be an inert in the reactions for the discharging and charging cycles.

Figure 5:
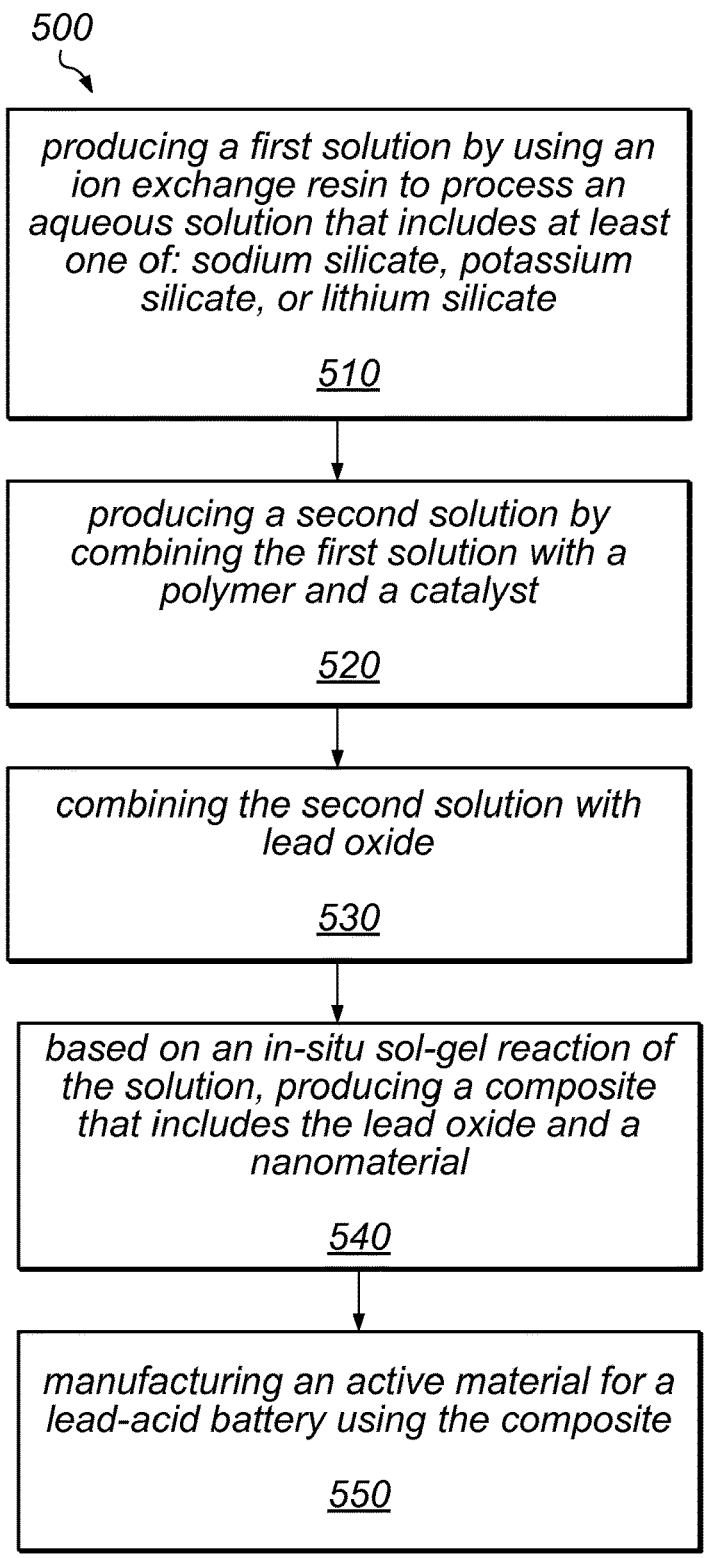
FIG. 5 illustrates an alternative method of making a component of a lead-acid battery according to an embodiment of the disclosure herein.

Turning now to FIG. 5 in which method 500 for making a component of a lead-acid battery is illustrated. Specifically, method 500 is directed to making a portion of a lead-acid battery such as lead-acid battery 100. Method 500 starts at block 510.

At block 510, a first solution is produced by using an ion exchange resin to process an aqueous solution of a silicate. The silicate may include at least one of: may include at least one of: sodium silicate (e.g., $Na_2SiO_3$, $Na_4SiO_4$, or a combination of $Na_2SiO_3$ and $Na_4SiO_4$), potassium silicate (e.g., $K_2SiO_3$, $K_4SiO_4$, or a combination of $K_2SiO_3$ and $K_4SiO_4$), or lithium silicate (e.g., $Li_2SiO_3$, $Li_4SiO_4$, or a combination of $Li_2SiO_3$ and $Li_4SiO_4$). In certain embodiments, the silicate may be in aqueous form, that is, the aqueous form of the silicate may include at least one of: sodium silicate in aqueous form (may also be referred to as "sodium water glass"), potassium silicate in aqueous form (may also be referred to as "potassium water glass"), or lithium silicate in aqueous form (may also be referred to as "lithium water glass"). Other forms of silicate may be specifically contemplated and included here.

In a particular embodiment, 210 grams of the aqueous solution is processed. In the 210 grams of the aqueous solution, the weight percentage of sodium silicate is 8%. By processing the aqueous solution of sodium silicate (e.g., sodium water glass) by using the ion exchange resin (e.g., cation exchange resin), the sodium silicate to silicic acid which is included in the first solution. In one non-limiting example, the processing using the ion exchange resin may be facilitated by a fixed bed ion exchanged process. Operation proceeds to block 520.

At block 520, a second solution is produced by combining the first solution produced at block 510 with a polymer and a catalyst. In one non-limiting embodiment, the catalyst may include an acidic catalyst. The acidic catalyst may include at least one of: nitric acid, sulfuric acid, hydrochloric acid, phosphoric acid, propionic acid, acetic acid, formic acid, tartaric acid, citric acid, salicylic acid, oxalic acid, or any combination thereof. In an alternative embodiment, however, an alkaline catalyst may be applied to the in-situ sol-gel reaction. The alkaline catalyst may include at least one of: ammonia, ethanol amine, diethanolamine, triethanolamine, sodium hydroxide, potassium hydroxide, lithium hydroxide, magnesium hydroxide, or any combination thereof. Other catalysts are specifically contemplated and included here.

The polymer may include a naturally occurring polymer or a synthetic polymer. The polymer may include but is not limited to a water-soluble polymer. For example, the polymer includes at least one of: polyethylene glycol, polyvinyl alcohol, polyacrylamide, phenol formaldehyde resin, a gelatin type material, polyethyleneimine, polyacrylic acid, polymethacrylic acid, or cellulose. In some embodiments, the polymer may facilitate stabilizing the second solution.

In the particular embodiment in which 210 grams of the aqueous solution is processed to produce the first solution, a pH value of the first solution may be adjusted to a pH value of 4.16 by using sodium hydroxide (e.g., a diluted solution of sodium hydroxide). After adjusting the pH value, 2 grams of polyethylene glycol (e.g., a polyethylene glycol solution) may be added to (e.g., mixed thoroughly with) the first solution whose pH value has been adjusted to produce the second solution. Operation proceeds to block 530.

At block 530, the second solution produced at block 520 is combined with lead oxide. In one non-limiting embodiment, the lead oxide being combined with the second solution may be in powder form. For example, lead oxide having a grain size that is between 1 micrometer and 50 micrometers may be considered to be in powder form. However, the lead oxide is not limited to a particular grain size or a particular grain size range. The lead oxide may include at least one of: lead monoxide (e.g., PbO), lead dioxide (e.g., $PbO_2$), triplumbic tetroxide (e.g., $Pb_3O_4$), or any combination thereof.

In the particular embodiment in which the second solution is produced based on 210 grams of the aqueous solution and 2 grams of polyethylene glycol, 1000 grams of lead oxide may be combined with the second solution. The second solution may be thoroughly mixed with the lead oxide. Operation proceeds to block 540.

At block 540, a composite that includes the lead oxide and a nanomaterial may be produced based on an in-situ sol-gel reaction of the second solution. The in-situ sol-gel reaction of the second solution may take place in the presence of the lead oxide.

In the particular embodiment in which 1000 grams of the lead oxide is combined with the second solution produced based on 210 grams of the aqueous solution and 2 grams of polyethylene glycol, the combined second solution and lead oxide may be heated to and maintained at 60 Celsius for an in-situ sol-gel reaction to take place. When a gel is formed as part of the in-situ sol-gel reaction, the temperature may be maintained at 60 Celsius for 26 hours. The in-situ sol-gel reaction may produce silicon dioxide (e.g., $SiO_2$) that is in-situ formed in the presence of the lead oxide. After cooling the gel to room temperature, the gel may be pressed or ground. Thereafter, the ground gel may be subject to a heat treatment at a temperature of 230 Celsius for 18 hours to produce a composite that includes the lead oxide and nano-sized silicon dioxide. Operation proceeds to block 550.

At block 550, the composite produced at block 540 may be incorporated into an active material for a lead-acid battery. The active material having incorporated the composite may result in various favorable properties of the lead-acid battery. For example, a life expectancy of a lead-acid battery (e.g., a deep cycle battery) having the active material that includes the composite produced at block 540 may be greatly increased. Other properties of the lead-acid battery such as the specific energy and power-to-weight ratio may also be increased. Operation ends at block 550.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   preparing a solution based on a precursor, wherein the precursor includes a solvent, water, a polymer, and a metal alkoxide;
   combining the solution with lead oxide; and
   producing a composite based on an in-situ sol-gel reaction of the solution, the composite including the lead oxide and a nanomaterial.

2. The method of claim 1, wherein the polymer includes at least one of: polyethylene glycol, polyvinyl alcohol, polyacrylamide, phenol formaldehyde resin, a gelatin type material, polyethyleneimine, polyacrylic acid, polymethacrylic acid, or cellulose, and wherein the method further comprises:
   producing a hydrophilic gel that includes the nanomaterial.

3. The method of claim 1, further comprising:
   removing, from the composite, at least a portion of the water.

4. The method of claim 1, wherein combining the solution with lead oxide comprises combining the lead oxide in powder form, and wherein the lead oxide in the powder form has a grain size that is between 1 micrometer and 50 micrometers.

5. The method of claim 1, wherein the nanomaterial has a grain size that is between 1 nanometer and 100 nanometers.

6. The method of claim 1, wherein the nanomaterial is an oxide of the metal alkoxide.

7. The method of claim 1, wherein the metal alkoxide includes at least one of: tetramethyl orthosilicate, tetraethyl orthosilicate, tetrabutyl titanate, titanium ethoxide, titanium isopropoxide, or titanium tert-butoxide.

8. The method of claim 1, wherein the solvent includes at least one of: methanol, ethanol, isopropyl alcohol, n-butanol, isobutanol, tert-butyl alcohol, acetone, acetylacetone, or butanone, or ethanolamine.

9. The method of claim 1, further comprising:
applying a catalyst to the solution, wherein the catalyst includes an acidic catalyst or an alkaline catalyst, wherein the acidic catalyst includes at least one of: nitric acid, sulfuric acid, hydrochloric acid, phosphoric acid, propionic acid, acetic acid, formic acid, tartaric acid, citric acid, salicylic acid, or oxalic acid; and wherein the alkaline catalyst includes at least one of: ammonia, ethanol amine, diethanolamine, triethanolamine, sodium hydroxide, potassium hydroxide, lithium hydroxide, or magnesium hydroxide.

10. The method of claim 1, wherein the solution includes: 1 part of the metal alkoxide, 20 to 200 parts of the solvent, 0.01 to 0.1 parts of the water and 0.0001 to 0.02 parts of the polymer.

11. The method of claim 1, wherein the solution includes: 0.0001 to 0.02 parts of the polymer.

12. The method of claim 1, wherein the lead oxide comprises at least one of: lead monoxide, lead dioxide, or triplumbic tetroxide.

13. The method of claim 1, wherein the nanomaterial includes at least one of: silicon dioxide or titanium dioxide.

14. The method of claim 1, wherein the nanomaterial is formed from the metal alkoxide.

15. The method of claim 1, wherein the in-situ sol-gel reaction of the solution is initiated by heating the solution.

16. The method of claim 1, wherein the metal alkoxide is a titanium alkoxide.

17. The method of claim 1, wherein the metal alkoxide is a silicon alkoxide.

18. The method of claim 1, further comprising producing a lead-acid battery using the composite.

19. A lead-acid battery that includes a composite produced by the method in claim 1, the composite comprising a lead oxide and a nanomaterial, wherein the nanomaterial comprises non-aggregated nanomaterial.

20. The lead-acid battery of claim 19, wherein a positive electrode and/or a negative electrode of the lead-acid battery comprises the composite.

* * * * *